United States Patent [19]
Romani

[11] Patent Number: 5,924,202
[45] Date of Patent: Jul. 20, 1999

[54] VARIABLE VACUUM ATTACHMENT FOR HAIR GROOMING CLIPPER HAVING ADJUSTABLE AUXILIARY VACUUM RELIEF MECHANISM

[75] Inventor: R. Marlene Romani, Indiana, Pa.

[73] Assignee: M.D.C. Romani, Inc., Indiana, Pa.

[21] Appl. No.: 08/941,414

[22] Filed: Sep. 30, 1997

[51] Int. Cl.[6] .............................. B25F 3/00; B26B 11/00
[52] U.S. Cl. .............................................. 30/133; 30/132
[58] Field of Search ........................... 30/133, 201, 132, 30/123, 124; 15/300 R

[56] References Cited

U.S. PATENT DOCUMENTS

| | | | |
|---|---|---|---|
| 2,653,380 | 9/1953 | Atha | 30/133 |
| 2,748,472 | 6/1956 | Sheley et al. | 30/133 |
| 3,073,026 | 1/1963 | Schaedler | 30/133 |
| 3,217,407 | 11/1965 | Azar | 30/133 |
| 3,295,200 | 1/1967 | Padgett et al. | 30/133 |
| 3,331,130 | 7/1967 | Ligon | 30/133 |
| 3,348,308 | 10/1967 | Andis | 30/133 |
| 3,368,277 | 2/1968 | Ve Vea | 30/133 |
| 3,384,919 | 5/1968 | Jording et al. | 15/339 |
| 3,440,681 | 4/1969 | Hixson et al. | 30/133 X |
| 3,797,111 | 3/1974 | Keane | 30/133 |
| 5,088,199 | 2/1992 | Romani | 30/133 |

Primary Examiner—Douglas D. Watts
Attorney, Agent, or Firm—Michael R. Swartz; John R. Flanagan

[57] ABSTRACT

A variable vacuum attachment for a hair grooming clipper includes a body and a coupler connected to the body and having an end receiving an end of a hose connected to a vacuum source. The body is a suction head mounted on the hair grooming clipper and defining an air flow passage. A vacuum applied to the body through the coupler and hose will induce a hair cuttings-entrainable flow of air from the cutting head end of the clipper through the air flow passage of the body and therefrom through the coupler to the hose. The coupler has open opposite ends and an internal air flow channel extending therebetween. A vacuum relief mechanism on the coupler includes a vacuum relief port in an annular wall thereof intermediate between the open opposite ends of the channel for providing adjustable flow communication between the channel and the exterior of the coupler. The coupler has an annular recess around its exterior which is intermediate between the open opposite ends thereof such that the vacuum relief port of the coupler is formed within the annular recess. The vacuum relief mechanism further includes an annular closure preferably discontinuous in structure disposed around the exterior of the coupler in the annular recess so as to overlie the vacuum relief port. The annular closure is slidable relative to the coupler for selectively varying the amount of area of the vacuum relief port covered and thus closed by the closure so as to thereby regulate the degree of relief through the vacuum relief port of a vacuum condition within the coupler channel.

19 Claims, 3 Drawing Sheets

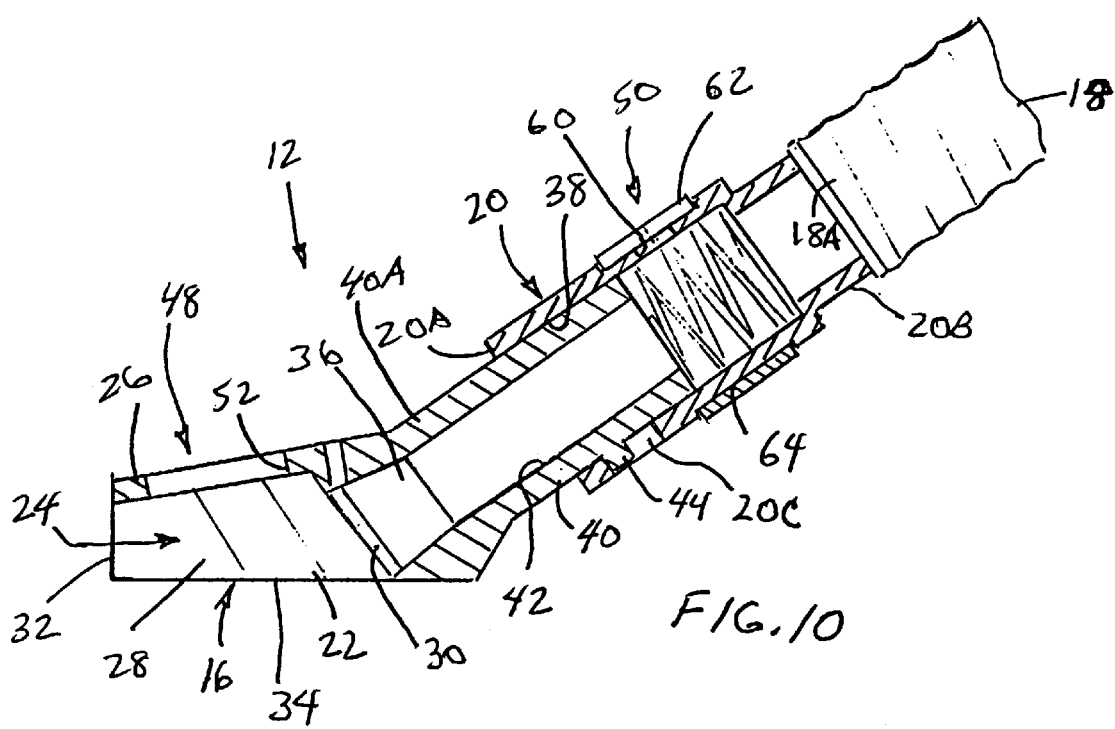

VARIABLE VACUUM ATTACHMENT FOR HAIR GROOMING CLIPPER HAVING ADJUSTABLE AUXILIARY VACUUM RELIEF MECHANISM

BACKGROUND OF THE INVENTION

1. Field of the Invention

The present invention generally relates to hair grooming clipper attachments and, more particularly, is concerned with a vacuum or suction attachment for a hair grooming clipper wherein the vacuum attachment has an adjustable auxiliary vacuum relief mechanism.

2. Description of the Prior Art

To obviate concerns of professional dog groomers with breathing of fine dog hair and other foreign matter in the lungs, vacuum systems are often employed with hair grooming clippers. Typically, a vacuum system includes a suction head that is attached to a hand-held clipper adjacent to its cutting head and is connected to one end of a flexible hose. The other end of the hose is connected directly or via an intermediate conduit to a vacuum generating unit for creating a vacuum in the hose. The vacuum condition draws air into the hose through the suction head, entraining hair cuttings in the air flow through the hose to the vacuum generating unit where the hair cuttings are collected, typically, in a container.

Attachments have been developed over the years which provide a vacuum system for the disposal of hair cuttings from hair grooming clippers. One highly effective prior art vacuum attachment is disclosed in U.S. Pat. No. 5,088,199 to Romani. While this prior art vacuum attachment introduced several features which operated to remove hair clippings in a highly effective way, it has only a single vacuum relief port. This one port may not provide sufficient adjustability in the amount of vacuum in the attachment in every situation.

Consequently, a need exists for an attachment design which will provide additional vacuum relief while still retaining the many advantageous features of the patented prior art vacuum attachment.

SUMMARY OF THE INVENTION

The present invention provides a variable vacuum attachment having an adjustable auxiliary vacuum relief mechanism which is designed to satisfy the aforementioned need. An adjustable primary vacuum relief mechanism provided on the body of the attachment is disclosed in the patented prior art vacuum attachment. The auxiliary vacuum relief mechanism of the present invention in combination with the primary vacuum relief mechanism provides a broader range of adjustment in the vacuum condition created in the variable vacuum attachment than before and yet retains the advantageous features of the patented prior art attachment.

Accordingly, the present invention is directed to a variable vacuum attachment for a hair grooming clipper. The variable vacuum attachment comprises: (a) a body defining an internal air flow passage and an inlet to and outlet from the passage; (b) a coupler connected to the body and having open opposite ends and defining an internal air flow channel extending between the open opposite ends and in flow communication with the passage of the body; and (c) a vacuum relief mechanism on the coupler disposed intermediate between the opposite ends of the channel for providing adjustable flow communication between the channel and the exterior of the coupler for regulating the degree of relief of a vacuum condition within the channel of the coupler and thereby within the passage of the body. The auxiliary vacuum relief mechanism includes a vacuum relief port defined in a wall of the coupler and a closure disposed around the exterior of the coupler so as to overlie the vacuum relief port. The closure is slidable about the coupler for varying the amount of area of the vacuum relief port in the coupler covered and thus closed by the closure so as to thereby regulate the degree of relief through the vacuum relief port in the coupler of the vacuum condition within the channel of the coupler.

The coupler further defines an annular recess extending around the exterior thereof which is disposed intermediate between the open opposite ends thereof such that the vacuum relief port in the coupler is entirely formed within the annular recess of the coupler. The closure is annular in shape being preferably in the form of a discontinuous ring disposed around the coupler and entirely within the exterior annular recess of the coupler. The closure is comprised of a substantially rigid but flexibly springable material and has a diameter slightly less than that of the exterior annular recess of the coupler so that it will remain at any desired angular position to which it is rotated about the coupler relative to the vacuum relief port.

The present invention is also directed to the variable vacuum attachment provided with a combination of two vacuum relief mechanisms, namely, the primary vacuum relief mechanism on the body and the auxiliary vacuum relief mechanism on the coupler. The primary vacuum relief mechanism per se is the same as disclosed in the patented prior art attachment. It provides a vacuum relief port in the form of a circular hole in the body and a closure in the form of a flexible flat sealing lid attached on the exterior of the body for covering the vacuum relief port. The vacuum relief port of the body is defined through a top wall thereof intermediate between the inlet and outlet of the passage through the body and provides flow communication between the passage and the exterior of the body. The sealing lid is a circular disc-like flap pivotally attached to the top wall adjacent to the vacuum relief port of the body. The auxiliary vacuum relief mechanism is the one described above. These two vacuum relief mechanisms, in combination, provide the variable vacuum attachment of the present invention with a broader range of adjustment in the vacuum condition created therein.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 10 is an enlarged vertical longitudinal sectional view through only the variable vacuum attachment of FIG. 1, showing the primary vacuum relief mechanism on the body and the auxiliary vacuum relief mechanism on the coupler of the attachment.

DETAILED DESCRIPTION OF THE INVENTION

Figure 1:
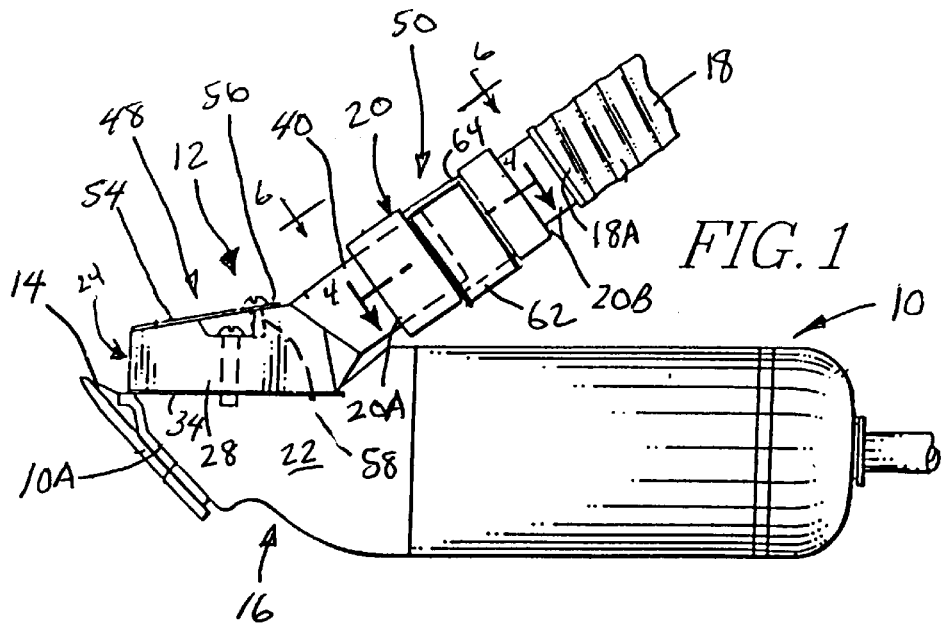
FIG. 1 is a side elevational view of a conventional hand-held hair grooming clipper and a variable vacuum attachment of the present invention mounted on the clipper and having the combination of two vacuum relief mechanisms, namely, a primary vacuum relief mechanism on a body and an auxiliary vacuum relief mechanism on a coupler of the attachment.
Figure 2:
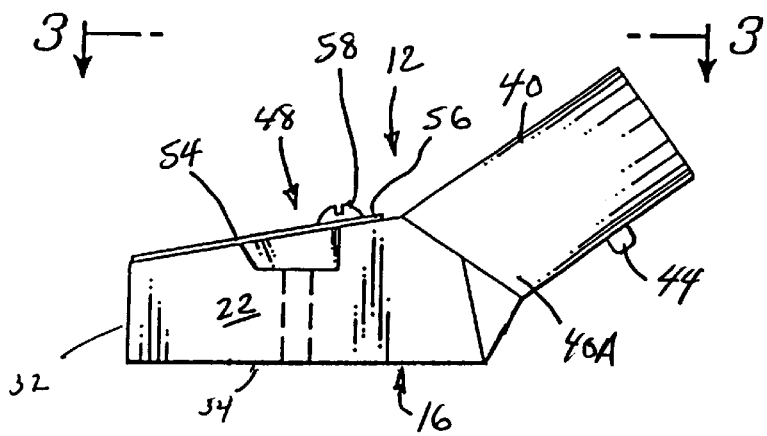
FIG. 2 is an enlarged side elevational view of the body of the attachment removed from the clipper.
Figure 3:
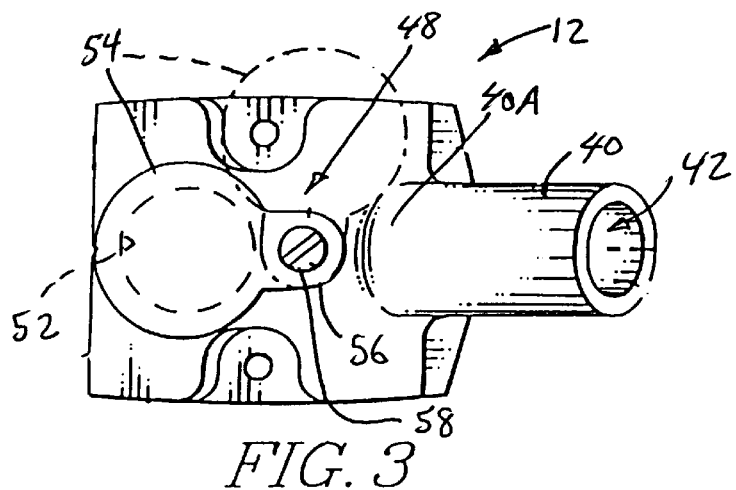
FIG. 3 is a top plan view of the body of the attachment as seen along line 3—3 of FIG. 2, showing only the primary vacuum relief mechanism of the patented prior art attachment.

In the following description, like reference characters designate like or corresponding parts throughout the several views of the drawings. Also in the following description, it is to be understood that such terms as "forward", "rearward", "left", "upwardly", "downwardly", and the like, are words of convenience and are not to be construed as limiting terms.

Referring now to the drawings, and particularly to FIG. 1, there is illustrated a conventional hand-held hair grooming clipper 10 and a variable vacuum attachment 12 in accordance with the present invention. The attachment 12 is mounted on a cutting head end 10A of the clipper 10 which has the clipper cutting blades 14 thereon. The attachment 12 includes a body 16, a hose 18 which leads to a source of vacuum (not shown), and a coupler 20 which is connected or attached, preferably releasably, to the body 16 in communication with an end 18A of the hose 18.

Referring to FIGS. 1–3 and 10, more particularly, the body 16 is in the form of a suction head 22 and defines an air flow passage 24. The body 16 has a top wall 26, a pair of side walls 28 and a rear wall 30. The side walls 28 extend downward from opposite lateral edges of the top wall 26 to define a front inlet 32. The rear wall 30 extends downward from a rear edge of the top wall 26 and between and interconnects with the side walls 28 at their rearward ends to define an open bottom 34. Also, a rear outlet 36 is defined through the rear wall 30 being substantially smaller in cross-sectional area than the front inlet 32. The coupler 20 has a pair of spaced apart open opposite ends 20A, 20B and defines an internal air flow channel 38 extending between the open opposite ends 20A, 20B. The coupler 20 at its one end 20A is applied over the rear outlet 36 of the body 16. The rear outlet 36 of the body 16 preferably has an extension thereon in the form of a hollow connector tube 40 integrally formed on the suction head 22. The coupler 20 fits over the connector tube 40 which defines a bore 42 leading from the rear outlet 36 to the end 18A of the hose 18 connected to the coupler 20.

Figure 4:
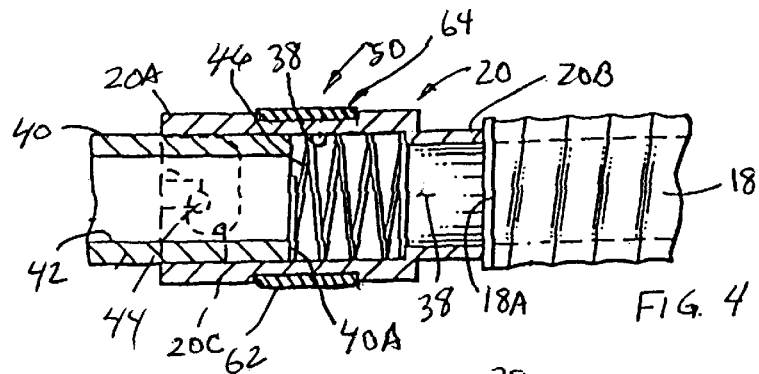
FIG. 4 is an enlarged longitudinal sectional view of the coupler applied over a tubular extension of the body of the attachment as taken along line 4—4 of FIG. 1, illustrating the auxiliary vacuum relief mechanism of the present invention and a spring element used with the attachment in a compressed condition.
Figure 5:
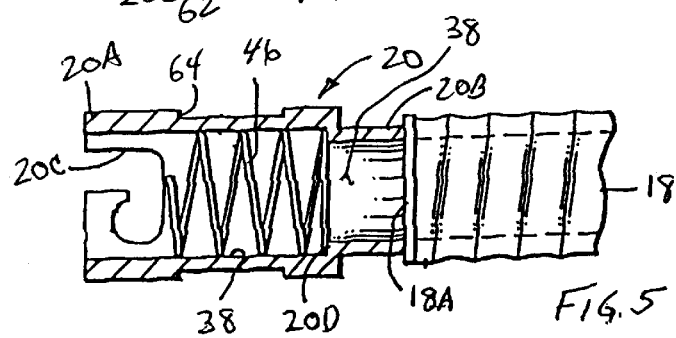
FIG. 5 is another view similar to that of FIG. 4, but showing the coupler without an annular closure of the auxiliary vacuum relief mechanism and illustrating the spring element in an extended condition.
Figure 6:
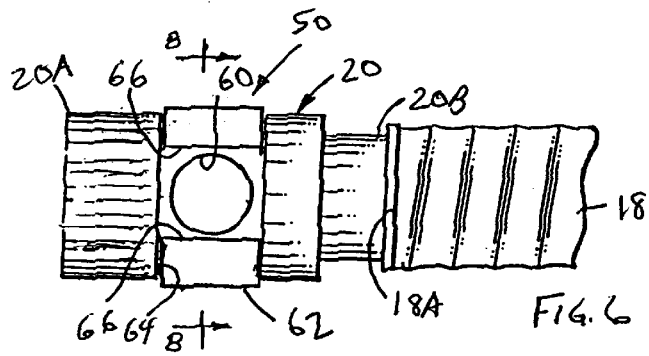
FIG. 6 is an enlarged top plan view of the coupler of the attachment as seen along line 6—6 of FIG. 1 and showing the annular closure of the auxiliary vacuum relief mechanism disposed so as to uncover an auxiliary vacuum relief port of the auxiliary vacuum relief mechanism and thereby provide the port in an open condition.

More particularly, referring to FIGS. 4 and 5, the coupler 20 is in the form of a tubular member having an L-shaped notch 20C defined therein which receives a nipple 44 defined on and protruding outwardly from the connector tube 40. The coupler 20 also includes a coil spring 46 which abuts between an internal shoulder 20D of the coupler 20 and the end 40A of the connector tube 40 and biases the coupler 20 away from the connector tube 40 so as to maintain the nipple 44 within an elbow end of the notch 20C. The coil spring 46 is shown in a contracted state in FIG. 4 wherein the connector tube 40 is connected to the coupler 20 and in an extended state in FIG. 5 wherein the connector tube 40 is disconnected from the coupler 20.

When the body 16 is installed on the cutting head end 10A of the clipper 10, the clipper 10 closes the open bottom 34 of the body 16. A vacuum applied to the body 16 through the hose 18 will now induce a hair cuttings and/or foreign matter-entrainable flow of air through the air flow passage 24 from the front inlet 32 to the rear outlet 36 of the body 16 and therefrom through the coupler 20 to the hose 18. It can be readily understood that as hair is cut by the clipper 10, the loose hair cuttings will be sucked into the suction head 22 through the front inlet 32 located immediately rearward of the cutting blades 14. The hair cuttings will be entrained in the flow of air traveling rearward through the passage 24 to the hose 18. Although not shown, as well-known in the art, the hair cuttings will be deposited from the hose 18 into a collection container.

For performing different lengths and styles of hair cuts on dogs, it is desirable to be able to easily and frequently vary the amount of vacuum applied through the body 16. By provision of a combination of two vacuum relief mechanisms in the attachment 12, namely, a primary vacuum relief mechanism 48 on the body 16 and an auxiliary vacuum relief mechanism 50 on the coupler 20 of the attachment 12, the regulation of the vacuum condition within the suction head 22 can be easily and readily accomplished. While the use of the primary and auxiliary vacuum relief mechanisms 48, 50 in combination provides the variable vacuum attachment 12 with a broader range of adjustment in the vacuum condition therein than with the use of only one of the mechanisms 48, 50 alone, it should be understood that the present invention also relates the provision of the auxiliary vacuum relief mechanism 50 on the coupler 20 by itself. The provision of the primary vacuum relief mechanism 48 on the body 16 by itself is the subject invention of the above-cited prior art patent.

As described in the above-cited patent, the primary vacuum relief mechanism 48 provided on the body 16 of the attachment 12 includes a primary vacuum relief port 52 in the form of a circular hole in the body 16 and a primary closure 54 attached on the exterior of the body 16 so as to overlie the primary vacuum relief port 52 and for undergoing pivotal movement relative to the body 16 and the primary vacuum relief port 52. The primary vacuum relief port 52 is defined through the top wall 26 of the body 16 intermediate between the front inlet 32 and the rear outlet 36 of the passage 24, providing flow communication between the passage 24 and the exterior of the body 16. The primary closure 54 is a flexible sealing lid in the form of a circular disc-like flap attached at only a tab 56 protruding from one location of a periphery thereof to the top wall 26 by a fastener 58 adjacent to the primary vacuum relief port 52 (see FIGS. 1 and 3). When the primary closure 54 overlies the primary vacuum relief port 52, the vacuum condition within the passage 24 draws the primary closure 54 toward the primary vacuum relief port 52 into a sealing relation against the peripheral edge of the primary closure 54. However, by pushing on the edge of the primary closure 54 with a finger, a user can readily slidably move the primary closure 54 relative to the fastener 58 and primary vacuum relief port 52 for varying the amount of area of the primary vacuum relief port 52 covered and thus closed by the primary closure 54 so as to thereby regulate the degree of relief provided by the primary vacuum relief port 52 of the vacuum condition applied through the body 16 within the passage 24 thereof.

By provision of the auxiliary vacuum relief mechanism 50 of the present invention, an improved range of air flow and suction is obtained through the body 16. Referring to FIGS. 1–3 and 6–10, the auxiliary vacuum relief mechanism 50 is disposed intermediate between the opposite ends 20A, 20B of the channel 38 in the coupler 20 for providing adjustable flow communication between the internal channel 38 and the exterior of the coupler 20 for regulating the degree of relief of a vacuum condition within the channel 38 of the coupler 20 and thereby within the passage 24 of the body 16.

More particularly, the auxiliary vacuum relief mechanism 50 includes an auxiliary vacuum relief port 60 defined in the tubular member of the coupler 20 and an auxiliary closure 62 disposed around the exterior of the coupler 20 so as to overlie the auxiliary vacuum relief port 60. The auxiliary closure 62 is slidable about the coupler 20 for varying the amount of area of the auxiliary vacuum relief port 60 in the coupler 20 covered and thus closed by the auxiliary closure 62 so as to thereby regulate the degree of relief through the auxiliary vacuum relief port 60 in the coupler 20 of the vacuum condition within the internal channel 38 of the coupler 20.

Figure 7:
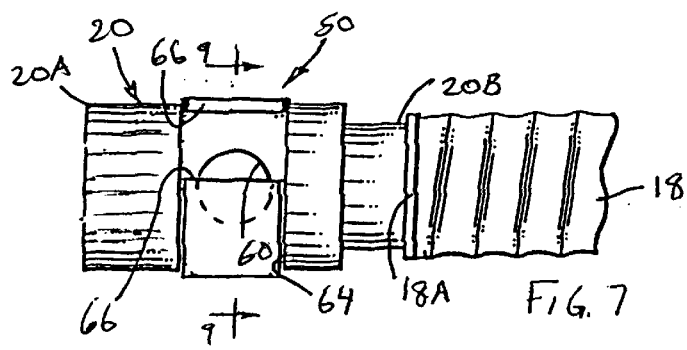
FIG. 7 is another view similar to that of FIG. 6, but showing the annular closure disposed so as to partially cover the auxiliary vacuum relief port and thereby provide the port in a partially closed condition.
Figures 8, 9:
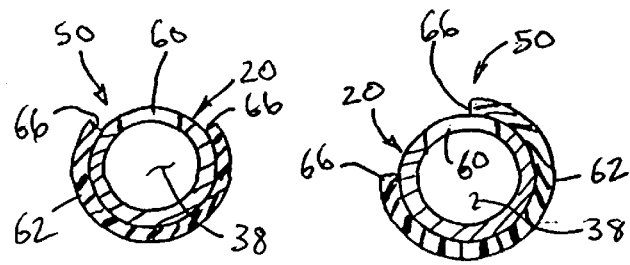
FIG. 8 is a transverse sectional view on a slightly reduced scale taken along line 8—8 of FIG. 6.
FIG. 9 is a transverse sectional view on a slightly reduced scale taken along line 9—9 of FIG. 7.

The coupler 20 further has an annular recess 64 extending around the exterior thereof which is disposed intermediate between the open opposite ends 20A, 20B thereof such that the auxiliary vacuum relief port 60 in the coupler 20 is entirely formed within the exterior annular recess 64 of the coupler 20. The auxiliary closure 62 is annular in shape being preferably in the form of a discontinuous or split ring disposed around the coupler 20 and entirely within the exterior annular recess 64 of the coupler 20. The annular closure 62 is comprised of a substantially rigid but flexibly springable material and has a diameter slightly less than that of the exterior annular recess 64 of the coupler 20 so that it will remain at any desired angular position to which it is rotated about the coupler 20 relative to the auxiliary vacuum relief port 60. The auxiliary closure 62 may be made of any other suitable material. The split in the auxiliary closure 62 defines a pair of opposite end edges 66 which are displaced from one another through a distance at least about equal to a diameter of the auxiliary vacuum relief port 60 in the coupler 20 with the annular auxiliary closure 62 is disposed about the coupler 20 within the exterior annular recess 64 thereof. Such distance between the edges 66 of the auxiliary closure 62 ensures that the auxiliary vacuum relief port 60 will be completely uncovered by the coupler 20 in the position thereof shown in FIGS. 6 and 8. A small amount of rotation of the auxiliary closure 62 relative the coupler 20 will start to partially close the auxiliary vacuum relief port 60 as shown in FIGS. 7 and 9.

It is thought that the present invention and many of its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A variable vacuum attachment for a hair grooming clipper, said attachment comprising:
    (a) a body defining an internal air flow passage and an inlet to and outlet from said passage;
    (b) a coupler connected to said body and having open opposite ends and defining an internal air flow channel extending between said open opposite ends and in flow communication with said passage of said body; and
    (c) a vacuum relief mechanism on said coupler intermediate between said open opposite ends of said channel for providing adjustable flow communication between said channel and an exterior of said coupler for regulating the degree of relief of a vacuum condition within said channel of said coupler and thereby within said passage of said body, said vacuum relief mechanism including
        a wall portion of said coupler having a vacuum relief port defined therein; and
        a closure mounted on said coupler so as to overlie said vacuum relief port and for undergoing movement relative to said coupler for varying the amount of area of said vacuum relief port in said coupler covered and thus closed by said closure so as to thereby regulate the degree of relief through said vacuum relief port in said coupler of said vacuum condition within said channel of said coupler, said closure having an annular configuration and is disposed about said exterior of said coupler and slidable relative thereto so as to overlie said vacuum relief port and be movable relative thereto in order to regulate the degree of relief of vacuum through said vacuum relief port.

2. The attachment as recited in claim 1, wherein said closure is a discontinuous ring having a pair of opposite end edges.

3. The attachment as recited in claim 2, wherein said opposite end edges of said ring are displaced from one another through a distance at least about equal to a diameter of said vacuum relief port in said coupler with said ring disposed about said exterior of said coupler.

4. The attachment as recited in claim 2, wherein said ring is comprised of a substantially rigid but flexibly springable material and has a diameter slightly less than that of said coupler so that said coupler will remain at any desired angular position to which it is rotated about said coupler relative to said vacuum relief port.

5. The attachment as recited in claim 1, wherein said coupler has an annular recess extending around said exterior thereof and disposed intermediate between said opposite ends thereof, said vacuum relief port being formed within said annular recess of said coupler.

6. The attachment as recited in claim 5, wherein said closure is a discontinuous ring having a pair of opposite end edges and slidably disposed within said exterior annular recess of said coupler.

7. The attachment as recited in claim 6, wherein said opposite end edges of said ring are displaced from one another through a distance at least about equal to a diameter of said vacuum relief port in said coupler with said ring disposed about said coupler within said exterior annular recess thereof.

8. The attachment as recited in claim 6, wherein said ring is comprised of a substantially rigid but flexibly springable material and has a diameter slightly less than that of said exterior annular recess of said coupler so that said coupler will remain at any desired angular position to which it is rotated about said coupler relative to said vacuum relief port.

9. A variable vacuum attachment for a hair grooming clipper, said attachment comprising:

(a) a body defining an internal airflow passage and an inlet to and outlet from said passage;

(b) a primary vacuum relief mechanism on said body intermediate between said inlet and outlet of said passage for providing adjustable flow communication between said passage and an exterior of said body for regulating the degree of relief of a vacuum condition within said passage of said body;

(c) a coupler connected to said body and having open opposite ends and defining an internal air flow channel extending between said open opposite ends and in flow communication with said passage of said body; and (d) an auxiliary vacuum relief mechanism separate from said primary relief mechanism and disposed on said coupler intermediate between said open opposite ends of said channel for providing adjustable flow communication between said channel and an exterior of said coupler for regulating the degree of relief of a vacuum condition within said channel of said coupler and thereby within said passage of said body, said primary and auxiliary vacuum relief mechanism in combination providing said variable vacuum attachment with a broad range of adjustment in said vacuum condition therein.

10. The attachment as recited in claim 9, wherein said auxiliary vacuum relief mechanism includes:

a wall portion of said coupler having an auxiliary vacuum relief port defined therein; and an auxiliary closure mounted on said coupler so as to overlie said auxiliary vacuum relief port and for undergoing movement relative to said coupler for varying the amount of area of said auxiliary vacuum relief port in said coupler covered and thus closed by said closure so as to thereby regulate the degree of relief through said auxiliary vacuum relief port in said coupler of said vacuum condition within said channel of said coupler.

11. The attachment as recited in claim 10, wherein said auxiliary closure has an annular configuration and is disposed about said exterior of said coupler and slidable relative thereto so as to overlie said auxiliary vacuum relief port and be movable relative thereto in order to regulate the degree of relief of vacuum through said auxiliary vacuum relief port.

12. The attachment as recited in claim 11, wherein said auxiliary closure is a discontinuous ring having a pair of opposite end edges.

13. The attachment as recited in claim 12, wherein said opposite end edges of said ring are displaced from one another through a distance at least about equal to a diameter of said auxiliary vacuum relief port in said coupler with said ring disposed about said exterior of said coupler.

14. The attachment as recited in claim 12, wherein said ring is comprised of a substantially rigid but flexibly springable material and has a diameter slightly less than that of said coupler so that said coupler will remain at any desired angular position to which it is rotated about said coupler relative to said auxiliary vacuum relief port.

15. The attachment as recited in claim 11, wherein said coupler has an annular recess extending around said exterior thereof and disposed intermediate between said opposite ends thereof, said auxiliary vacuum relief port being formed within said annular recess of said coupler.

16. The attachment as recited in claim 15, wherein said auxiliary closure is a discontinuous ring having a pair of opposite end edges and slidably disposed within said exterior annular recess of said coupler.

17. The attachment as recited in claim 16, wherein said opposite end edges of said ring are displaced from one another through a distance at least about equal to a diameter of said auxiliary vacuum relief port in said coupler with said ring disposed about said exterior of said coupler within said exterior annular recess thereof.

18. The attachment as recited in claim 16, wherein said auxiliary closure is comprised of a substantially rigid but flexibly springable material and has a diameter slightly less than that of said exterior annular recess of said coupler so that said coupler will remain at any desired angular position to which it is rotated about said coupler relative to said auxiliary vacuum relief port.

19. The attachment as recited in claim 9, wherein said primary vacuum relief mechanism includes:

a wall portion of said body having a primary vacuum relief port defined therein intermediate between said inlet and outlet thereof and providing flow communication between said passage and an exterior of said body; and a primary closure attached on said exterior of said body so as to overlie said primary vacuum relief port and for undergoing pivotal movement relative to Egg said body and said primary vacuum relief port for varying the amount of area of said primary vacuum relief port covered and thus closed by said primary closure so as to thereby regulate the degree of relief through said primary vacuum relief port in said body of said vacuum condition within said passage thereof.

\* \* \* \* \*